United States Patent [19]
Abekawa et al.

[11] Patent Number: 5,908,607
[45] Date of Patent: Jun. 1, 1999

[54] PROCESS FOR PRODUCING CHLORINE

[75] Inventors: Hiroaki Abekawa; Yoshiaki Ito; Takuo Hibi, all of Chiba, Japan

[73] Assignee: Sumitomo Chemical Co., Ltd., Osaka, Japan

[21] Appl. No.: 08/908,958

[22] Filed: Aug. 8, 1997

[30] Foreign Application Priority Data

| Aug. 8, 1996 | [JP] | Japan | 8-210086 |
| Nov. 5, 1996 | [JP] | Japan | 8-292464 |
| Nov. 8, 1996 | [JP] | Japan | 8-296304 |
| Nov. 14, 1996 | [JP] | Japan | 8-302655 |

[51] Int. Cl.$^6$ .................................................. C01B 7/01
[52] U.S. Cl. ........................ 423/502; 423/507; 502/325
[58] Field of Search ................... 423/502, 507; 502/325

[56] References Cited

U.S. PATENT DOCUMENTS

| 3,177,258 | 4/1965 | Rylander et al. | 568/579 |
| 3,880,775 | 4/1975 | Gandhi et al. | 502/302 |
| 4,059,676 | 11/1977 | Yang et al. | 423/502 |
| 4,847,231 | 7/1989 | Grätzel et al. | 502/74 |
| 4,962,267 | 10/1990 | Slaugh | 585/670 |
| 5,260,044 | 11/1993 | Hiraoka et al. | 423/240 S |

FOREIGN PATENT DOCUMENTS

| 0184413 | 6/1986 | European Pat. Off. . |
| 0743277 | 11/1996 | European Pat. Off. . |
| 1567788 | 2/1970 | Germany . |
| 43 805 | 1/1967 | Japan . |
| 1046313 | 10/1966 | United Kingdom . |

OTHER PUBLICATIONS

S. Imamuara et al., "Decomposition of Carbon Tetrachloride by Noble metal Supported Titaniasilica Catalysts", *5th Flon–Related Study Meeting*, Jun. 23, 1995, pp. 30–31.

S. Imamuara et al., "Decomposition of 1,2 Dichloroethane by Ruthenium–Supported Titaniasilica Catalyst", *78th Catalystic Study Presentation Meeting*, Sep. 13, 1996, p. 193.

*Primary Examiner*—Ngoc-Yen Nguyen
*Attorney, Agent, or Firm*—Sughrue, Mion, Zinn, Macpeak & Seas, PLLC

[57] ABSTRACT

A process for producing chlorine by oxidizing hydrogen chloride with oxygen, which comprises using at least one catalyst selected from the group consisting of a supported ruthenium chloride catalyst, a catalyst obtained by supporting at least one ruthenium compound, a ruthenium oxide catalyst obtained by oxidizing a catalyst which is prepared by supporting at least one ruthenium compound, and a catalyst obtained by calcining ruthenium chloride supported on a carrier at the temperature of not less than 280° C.

7 Claims, No Drawings

PROCESS FOR PRODUCING CHLORINE

FIELD OF THE INVENTION

The present invention relates to a process for producing chlorine. More particularly, it relates to a process for producing chlorine, comprising oxidizing hydrogen chloride, which makes it possible to produce chlorine at a lower reaction temperature using a smaller amount of catalyst having high activity and high activity per ruthenium contained.

BACKGROUND OF THE INVENTION

It is known that chlorine is useful as a raw material of vinyl chloride, phosgene, etc., and can be produced by oxidizing hydrogen chloride. For example, the Deacon reaction using a Cu catalyst is well known. For example, a method for oxidizing hydrogen chloride with a catalyst containing a ruthenium compound is described in West German Patent No. 1,567,788 and, there is also described that ruthenium (III) chloride is particularly effective among the ruthenium compounds. Furthermore, a method for supporting a ruthenium compound on a carrier is also described and, as the carrier, silica gel, alumina, pumice stone and ceramic material are exemplified. As the Example, a ruthenium chloride catalyst supported on silica is exemplified. However, a test was conducted using a catalyst prepared by using a method for preparing a silica-supported ruthenium (III) chloride described in said patent. As a result, the ruthenium compound as a catalyst component is drastically volatilized and it was disadvantageous for industrial use. For example, a method for oxidizing hydrogen chloride with a chromium oxide catalyst is described in EP0184413 A2. However, a method which has hitherto been known had a problem that the activity of the catalyst is insufficient and high reaction temperature is required.

When the activity of the catalyst is low, it is necessary to make the reaction temperature higher but the reaction of oxidizing hydrogen chloride with oxygen to produce chlorine is an equilibrium reaction. When the reaction temperature is high, it becomes disadvantageous in view of equilibrium and the equilibrium conversion of hydrogen chloride becomes lower. Therefore, when the catalyst has high activity, the reaction temperature can be decreased and, therefore, the reaction becomes advantageous in view of equilibrium and higher conversion of hydrogen chloride can be achieved. In case of high temperature, the activity is lowered by volatilization of the catalyst component.

Both high activity and high activity per unit weight of ruthenium contained in the catalyst are required to the catalyst, industrially. Since high activity per unit weight of ruthenium contained in the catalyst can reduce the amount of ruthenium contained in the catalyst, it becomes advantageous in view of cost. It is possible to select the reaction condition which is more advantageous in view of equilibrium by conducting the reaction at a lower temperature using a catalyst having high activity. It is preferred to conduct the reaction at a lower temperature in view of stability of the catalyst.

In these points of view, the development of the catalyst which can be used at low temperature have been required.

SUMMARY OF THE INVENTION

The present inventors have studied intensively about the method for producing chlorine improving the above-described problems. As a result, it has been found that, when using a specific catalyst containing ruthenium in the production of chlorine, there can be produced chlorine at a lower reaction temperature using a smaller amount of catalyst having high activity and high activity per ruthenium contained. Thus, the present invention has been accomplished.

That is, the present invention provides a method for producing chlorine by oxidizing hydrogen chloride with oxygen, which comprises using at least one catalyst selected from the group consisting of the following catalysts (a) to (d):

(a) a supported ruthenium chloride catalyst, in which a carrier is a carrier containing at least one compound of titanium oxide and zirconium oxide and a weight ratio of ruthenium to the carrier is from 0.5 to 20% by weight, (b) a catalyst obtained by supporting at least one ruthenium compound selected from the group consisting of ruthenium-carbonyl complex, ruthenium organic acid salt, ruthenium-nitrosyl complex, ruthenium-amine complex, chloride of ruthenium-amine complex, ruthenium-organic amine complex and ruthenium-acetyl acetonate complex on a carrier, in which a weight ratio of ruthenium to the carrier is from 0.5 to 20% by weight, (c) a ruthenium oxide catalyst obtained by oxidizing a catalyst which is prepared by supporting at least one ruthenium compound selected from the group consisting of chlororuthenate, chlororuthenate hydrate, salt of ruthenic acid, salt of ruthenium oxychloride, ruthenium-amine complex, chloride or bromide of ruthenium-amine complex, ruthenium bromide, ruthenium-organic amine complex, ruthenium-acetyl acetonate complex, ruthenium-carbonyl complex, ruthenium organic acid salt, ruthenium-nitrosyl complex and ruthenium-phosphine complex on a carrier, in which a weight ratio of ruthenium to the carrier is from 0.5 to 20% by weight, and (d) a catalyst obtained by calcining ruthenium chloride supported on a carrier at the temperature of not less than 280° C.

DETAILED DESCRIPTION OF THE INVENTION

The ruthenium catalyst used in the present invention is a supported catalyst containing ruthenium chloride or a ruthenium compound, and is at least one catalyst selected from the group consisting of the catalysts (a), (b), (c) and (d).

In the present invention, the supported ruthenium catalyst in the catalyst (a) is a catalyst obtained by supporting ruthenium chloride on a carrier.

As ruthenium chloride, ruthenium (III) chloride hydrate is normally used. When using the ruthenium (IV) chloride hydrate, it is sometimes decomposed during the preparation of the catalyst because of its instability. That is, examples of ruthenium chloride supported on the carrier include ruthenium (III) chloride, ruthenium (III) chloride hydrate, compound obtained by hydrolyzing ruthenium (III) chloride hydrate, ruthenium (IV) chloride hydrate and ruthenium compound formed by decomposing ruthenium (IV) chloride hydrate.

With respect to the catalyst (a) in the present invention, it is important that a catalyst containing at least one of titanium oxide and zirconium oxide is used as the catalyst of the supported ruthenium chloride catalyst. Examples of at least one carrier of titanium oxide and zirconium oxide, include titanium oxide carrier, zirconium oxide carrier or a mixture of these carriers, or a mixture of these carriers and a carrier other than the carriers (e.g. alumina, silica, etc.). By using the above carriers, a supported ruthenium catalyst having high activity can be obtained. A preferable carrier is a carrier containing titanium oxide, and a more preferable carrier is titanium oxide. The weight ratio of ruthenium to the carrier is from 0.5 to 20% by weight, preferably from 1 to 8% by weight, more preferably from 1 to 6% by weight.

When the ratio of ruthenium is too high, the price of the catalyst becomes high. On the other hand, when the ratio of ruthenium is too low, the activity of the catalyst becomes low.

As the preparation method, for example, there can be used a method of impregnating a carrier with an aqueous solution or hydrochloric acid solution of $RuCl_3 \cdot nH_2O$, followed by drying under reduced pressure or a nitrogen gas flow, or in air.

The catalytic activity can also be improved by adding a third component other than ruthenium. Examples of the third component include titanium compound, zirconium compound, noble metal compound other than ruthenium (e.g. palladium compound, etc.), rare earth compound, copper compound, chromium compound, nickel compound, alkaline metal compound, alkaline earth compound, manganese compound, alkaline earth compound, tantalum compound, tin compound, vanadium compound etc.

As the third component, titanium chloride, zirconium chloride, chlorides of noble metals other than ruthenium (e.g. palladium chloride, etc.), copper chloride, chromium chloride, manganese chloride, tantalum chloride, tin chloride, nickel chloride, etc. are preferred, and titanium chloride is more preferred.

The amount of the third component added is normally from 0.1 to 10% by weight based on the carrier.

As the method of adding the third component, for example, there can be used a method of impregnating a carrier with a solution obtained by mixing an aqueous solution or a hydrochloric acid solution of $TiCl_4$ with an aqueous solution or hydrochloric acid solution of $RuCl_3 \cdot nH_2O$, followed by drying under reduced pressure or a nitrogen gas flow, or in air. A mixing ratio of ruthenium chloride to titanium chloride is preferably from 100:1 to 100:10 in molar ratio of ruthenium to titanium.

The drying of the supported catalyst is preferably conducted at 30 to 200° C. under reduced pressure and about 60 to 400° C. in nitrogen because ruthenium chloride is volatilized when the temperature is too high and about 60 to 250° C. in air. The drying time is preferably from about 30 minutes to 5 hours.

Examples of the catalyst (b) in the present invention include catalysts prepared by supporting at least one ruthenium compound selected from the group consisting of ruthenium-carbonyl complex (e.g. $Ru(CO)_5$, $RU_3(CO)_{12}$, etc.), ruthenium organic acid salt (e.g. $[Ru_3O(OCOCH_3)_6 (H_2O)_3]OCOCH_3$ hydrate, $Ru_2(RCOO)_4Cl$ (R=alkyl group having 1 to 3 carbon atoms), etc.), ruthenium-nitrosyl complex (e.g. $K_2[RuCl_5NO]$, $[Ru(NH_3)_5(NO)]Cl_3$, $[Ru(OH) (NH_3)_4(NO)](NO_3)_2$, $Ru(NO)(NO_3)_3$ etc.), chloride of ruthenium-amine complex (e.g. $[Ru(NH_3)_6Cl]^{2+}$, $[Ru(NH_3)_6]^{3+}$, $[Ru(NH_3)_5H_2O]^{2+}$, etc.), ruthenium-organic amine complex and ruthenium-acetyl acetonate complex on a carrier such as alumina, silica, silica alumina, zeolite, diatomaceous earth or oxide and mixed oxide of elements (e.g. titanium oxide, zirconium oxide, vanadium oxide, etc.) etc. These carriers may be used in combination thereof. As the ruthenium compound, for example, ruthenium-carbonyl complex, ruthenium acetic acid, ruthenium-nitrosyl complex are preferred, and ruthenium-carbonyl complex and ruthenium acetic acid salt are more preferred. As the carrier, for example, titanium oxide, zirconium oxide, alumina, silica, titanium mixed oxide, zirconium mixed oxide and aluminum mixed oxide are preferred, and titanium oxide is more preferably.

The weight ratio of ruthenium to the carrier is from 0.5 to 20% by weight, preferably from 1 to 8% by weight, more preferably from 1 to 6% by weight.

Examples of the supporting method include impregnation method, ion-exchange method, precipitation supporting method, coprecipitation method, mixing method, etc. Among them, the impregnation method and ion-exchange method are preferred.

As the impregnation method, for example, there is a method of suspending a carrier in a solution, which is prepared by dissolving a ruthenium compound in a solvent, evaporating the solvent, followed by drying and further calcining. Examples of the solvent include water, methanol, organic solvent, etc.

The drying of the supported catalyst is preferably conducted at 30 to 200° C. under reduced pressure and about 60 to 400° C. in nitrogen because ruthenium compound is volatilized when the temperature is too high. In air, the temperature at which the ruthenium compound is not oxidized and decomposed by oxygen is general. The drying time is preferably from about 30 minutes to 5 hours.

Examples of the catalyst (c) used in the present invention include ruthenium oxide catalysts obtained by oxidizing catalyst which is prepared by supporting compounds such as chlororuthenate (e.g. $K_3RuCl_6$, $[RuCl_6]^{3-}$, $K_2RuCl_6$, etc.), chlororuthenate hydrate ($[RuCl_5H_2O)]^{2-1}$, $K_2[RuCl_5(H_2O)]$, $(NH_4)_2[RuCl_5(H_2O)]$, $[RuCl_2(H_2O)_4]+$, etc.), salt of ruthenic acid (e.g. $K_2RuO_4$, etc.), ruthenium oxychloride (e.g. $Ru_2OCl_4$, $Ru_2OCl_5$, $Ru_2OCl_6$, etc.), salt of ruthenium oxychloride (e.g. $K_2Ru_2OCl_{10}$, $Cs_2Ru_2OCl_4$ etc.), ruthenium-amine complex (e.g. $[Ru(NH_3)_6]^{2+}$, $[Ru(NH_3)_6]^{3+}$, $[Ru(NH_3)_5H_2O]^{2+}$, etc.), chloride and bromide of ruthenium-amine complex (e.g. $[Ru(NH_3)_5Cl]^{2+}$, $[Ru(NH_3)_6]Cl_2$, $[Ru(NH_3)_6]Cl_3$, $[Ru(NH_3)_6]Br_3$, etc.), ruthenium bromide (e.g. $RuBr_3$, $RuBr_3$ hydrate, etc.), ruthenium-organic amine complex, ruthenium-acetyl acetonate complex, ruthenium-carbonyl complex (e.g. $RU(CO)_5$, $Ru_3(CO)_{12}$, etc.), ruthenium organic acid salt (e.g. $[Ru_3O (OCOCH_3)_6(H_2O)_3]OCOCH_3$, $Ru_2(RCOO)_4Cl$ (R=alkyl group having 1 to 3 carbon atoms), etc.), ruthenium-nitrosyl complex (e.g. $K_2[RuCl_5NO]$, $[Ru(NH_3)_5(NO)]Cl_3$, $[Ru (OH)(NH_3)_4(NO)](NO_3)_2$, $Ru(NO)(NO_3)_3$, etc.) and ruthenium-phosphine complex on a carrier such as alumina, silica, silica alumina, zeolite, diatomaceous earth or oxide and mixed oxide of elements (e.g. titanium oxide, zirconium oxide, vanadium oxide, etc.) etc.

As the ruthenium compound supported on a carrier, for example, salt of ruthenic acid, ruthenium-amine complex, chloride of ruthenium-amine complex, ruthenium bromide, ruthenium-organic amine complex, ruthenium-acetyl acetonate complex, ruthenium-carbonyl complex, ruthenium organic acid salt, and ruthenium-nitrosyl complex are preferably used and ruthenium-amine complex, chloride of ruthenium-amine complex, ruthenium-carbonyl complex, ruthenium acetic acid salt are more preferably used and ruthenium-amine complex chloride, and ruthenium-nitrosyl complex are more preferably used. As the carrier, silica and titanium oxide are preferably used.

The weight ratio of ruthenium to the carrier is from 0.5 to 20% by weight, preferably from 1 to 8% by weight, more preferably from 1 to 6% by weight, more preferably from 2 to 6% by weight.

As the preparing method, for example, there may be used a method of calcining a catalyst obtained by supporting the above ruthenium compound on a carrier, in a gas containing oxygen. As the gas containing oxygen, air is normally used. The calcining temperature is preferably not less than 280° C., more preferably from 280 to 500° C. When the calcining temperature is too low, the ruthenium compound is remained without being sufficiently oxidized and decomposed, which results in insufficient catalytic activity. Furthermore, the ruthenium compound is sometimes volatilized during the reaction for production of chlorine. On the other hand, when the calcining temperature is too high, agglomeration of ruthenium oxide particles occurs and the catalytic activity is sometimes lowered.

The ruthenium compound supported on the carrier after calcining is converted into a ruthenium oxide catalyst. The calcining time is normally from 30 minutes to 5 hours. It can be confirmed by X-ray diffraction and analysis of XPS (X-ray photoelectrospectroscopy).

A third component other than ruthenium chloride and ruthenium compound may be added, and examples of the third component include palladium compound, copper compound, chromium compound, vanadium compound, nickel compound, alkaline metal compound, rare earth compound, manganese compound, alkaline earth compound, etc. The amount of the third component added is preferably from 0.1 to 10% by weight in ratio to the carrier.

The catalyst (d) in the present invention can be obtained by calcining ruthenium chloride supported on a carrier at the temperature of not less than 280° C.

Examples of the carrier include oxide or mixed oxide such as titanium oxide, alumina, zirconium oxide, silica, titanium mixed oxide, zirconium mixed oxide, aluminum mixed oxide, silicon mixed oxide, etc. Preferred carriers are titanium oxide, alumina, zirconium oxide and silica, and more preferred carriers are titanium oxide and zirconium oxide.

The supported ruthenium chloride in the present invention can be prepared by supporting on a carrier which is previously molded into a form corresponding to use of the catalyst. A preparing method of said catalyst is simple and, therefore, it has an advantage that a molded catalyst can be prepared at a cheap price.

The weight ratio of ruthenium to the carrier is preferably from 0.5 to 10% by weight, more preferably from 1 to 8% by weight, most preferably from 1 to 6% by weight.

When the amount of ruthenium is too small, the activity is sometimes lowered. On the other hand, when the amount of ruthenium is too large, the price of the catalyst sometimes becomes high.

As the method of producing the ruthenium chloride catalyst supported on the carrier, for example, there is a method of impregnating the above-described carrier (e.g. titanium oxide, alumina, zirconium oxide, silica, titanium mixed oxide, zirconium mixed oxide, aluminum mixed oxide, silicon mixed oxide, etc.) with an aqueous solution of ruthenium chloride or a hydrochloric acid solution of ruthenium chloride, followed by drying in nitrogen or air to support ruthenium chloride. A commercially available one can also be used as the carrier. As the carrier, powdered one can be used and molded one can also be used.

Examples of the calcining atmosphere include various atmospheres, preferably gas containing oxygen, e.g. air. The calcining temperature is not less than 280° C., preferably from 280 to 500° C., more preferably from 300 to 450° C. When the calcining temperature is too low, the catalytic activity becomes insufficient and the ruthenium compound is sometimes volatilized during the reaction for production of chlorine. On the other hand, when the calcining temperature is too high, the catalytic activity is sometimes lowered. The calcining time is normally from 30 minutes to 5 hours.

Since a method of calcining after adding a compound other than ruthenium compound, in addition to ruthenium compound, can make the catalyst activity higher, it is used as a preferred preparing method. As the compound to be added, for example, alkaline metal salts such as potassium chloride, sodium chloride, potassium nitrate, cesium nitrate, etc. are preferred. By calcining in the presence of the alkaline metal salt, ruthenium oxide can be oxidized and decomposed to form more fine ruthenium oxide particles and a catalyst having high activity can be obtained and, therefore, it is preferred. Specific examples of the method of calcining in the presence of the alkaline metal include method of impregnating a carrier on which was supported ruthenium chloride with an aqueous solution of the alkaline metal salt, followed by drying in oxygen or air and further calcining in air. The amount of the alkaline metal salt used is preferably from 0.01 to 10 in molar ratio to ruthenium. When the amount of the alkaline metal is too small, the effect of improving the catalytic activity is sometimes reduced. On the other hand, when the amount of the alkaline metal salt is too large, the price of the catalyst sometimes become high. The alkaline metal salt added is normally removed by washing with water, but the alkaline metal may be remained as far as the effect of the present invention is not damaged.

A third component other than ruthenium chloride and ruthenium compound may be added. Examples of the third component include palladium compound, copper compound, chromium compound, vanadium compound, nickel compound, rare earth compound, manganese compound, etc. The amount of the third component added is preferably from 0.1 to 10% by weight in ratio to the carrier.

The present invention discloses a method for producing chlorine, which comprises oxidizing hydrogen chloride with oxygen by the gas phase flow reaction using the above catalyst.

When using the catalyst in a fixed bed, since the reaction is normally conducted by filling an industrially large-scale device with the catalyst, the catalyst is preferably molded. The above catalyst may also be used in a fluidized bed. The catalyst in the present invention can be used in a reactor such as fixed bed reactor, fluidized reactor, tank type reactor, etc.

According to the present invention, chlorine is produced by oxidizing hydrogen chloride with oxygen using the above catalyst. In the production of chlorine, examples of the reaction system include flow system such as fixed bed, fluidized bed, etc. There can be preferably used a gas phase reaction such as fixed bed gas phase flow system, gas phase fluidized bed flow system, etc. The fixed bed system has an advantage that separation between a reaction gas and a catalyst is not necessary and that high conversion rate can be accomplished because a contact between a raw material gas and the catalyst can be sufficiently conducted. Furthermore, the fluidized bed system has an advantage that the temperature distribution width in the reactor can be reduced because heat in the reactor can be sufficiently removed.

When the reaction temperature is high, ruthenium in the high oxidation state is sometimes volatilized and, therefore, the reaction is preferably conducted at low temperature, more preferably from 100 to 500° C., most preferably from 200 to 380° C. Also, the reaction pressure is preferably from about atmospheric pressure to 50 atm. As the oxygen raw material, air may be used as it is or pure oxygen may be used. Since other components are discharged simultaneously when an inherent nitrogen gas is discharged from the apparatus, pure oxygen containing no inherent gas is preferred. A theoretical molar amount of oxygen for hydrogen chloride is ¼ mol, but oxygen is preferably supplied in a 0.1- to 10-fold amount for the theoretical amount. In case of the fixed bed gas phase flow system, the amount of the catalyst used is preferably from about 10 to 20,000 h$^{-1}$, when the amount is represented by the ratio GHSV to the supplying rate of hydrogen chloride as the raw material under atmospheric pressure.

The following Examples and Comparative Examples further illustrate the present invention in detail but are not to be construed to limit the scope thereof.

EXAMPLE 1

A catalyst was prepared by the following method. That is, a commercially available ruthenium chloride hydrate (RuCl$_3$·nH$_2$O) (1.41 g) was dissolved in water (3.2 g), followed by stirring to obtain an aqueous ruthenium chloride solution. The resulting aqueous solution was added dropwise to a titanium oxide carrier (CS-300S, manufactured by Sakai Chemical Industry Co., Ltd.) (5.0 g), obtained by adjusting a particle size to 12 to 18.5 mesh and drying in air at 500° C. for 1 hour, to impregnate and support ruthenium chloride. The supported one was heated from room temperature to 100° C. under a nitrogen flow (100 ml/min.) over about 0.5 hours and dried at the same temperature for 2 hours, and then heated from 100 to 250° C. under a nitrogen flow (100 ml/min.) over 50 minutes and dried at the same temperature for 3 hours to obtain a black solid (10.5 g). A titanium oxide-supported ruthenium chloride catalyst was obtained by adjusting a particle size of the resulting black solid to 12 to 18.5 mesh.

The calculated value of the content of ruthenium chloride was as follows.

RuCl$_3$/(RuCl$_3$+TiO$_2$)×100=9.3% by weight.

The calculated value of the content of ruthenium was as follows.

Ru/(RuCl$_3$+TiO$_2$)×100=4.5% by weight.

The titanium oxide-supported ruthenium chloride catalyst (2.5 g) thus obtained was charged in a quartz reaction tube (inner diameter: 12 mm). A hydrogen chloride gas (190 ml/min.) and an oxygen gas (200 ml/min.) were respectively supplied under atmospheric pressure (converted on the basis of 0° C., 1 atm). The quartz reaction tube was heated with an electric furnace to adjust the inner temperature (hot spot) to 300° C. 1.7 hours after the beginning of the reaction, the gas at the reaction outlet was sampled by passing it through an aqueous 30% potassium iodide solution, and then the amount of chlorine formed and amount of the non-reacted hydrogen chloride were respectively determined by iodometric titration and neutralization titration methods.

The formation activity of chlorine per unit weight of the catalyst determined by the following equation was 2.97×10$^{-4}$ mol/min·g-catalyst.

Chlorine formation activity per unit weight of catalyst (mol/min·g-catalyst)=amount of outlet chlorine formed (mol/min)/weight of catalyst (g).

The formation activity of chlorine per unit weight of Ru determined by the following equation was 65.6×10$^{-4}$ mol/min·g-Ru.

Chlorine formation activity per unit weight of Ru (mol/min·g-Ru)=amount of outlet chlorine formed (mol/min)/weight of Ru (g).

EXAMPLE 2

A catalyst was prepared by the following method. That is, a commercially available ruthenium chloride hydrate (RuCl$_3$·nH2O) (1.41 g) was dissolved in water (2.8 g), followed by stirring to obtain an aqueous ruthenium chloride solution. The resulting aqueous solution was added dropwise to a zirconium oxide carrier (E26H6, manufactured by Nikki Chemical Co., Ltd.) (10.0 g), obtained by adjusting a particle size to 12 to 18.5 mesh and drying in air at 500° C. for 1 hour, until pores of the zirconium oxide carrier are nearly filled with the aqueous solution, followed by crying under vacuum at 40° C. for 1 hour. The total amount of the aqueous solution was added dropwise by adding it again to impregnate and support ruthenium chloride, thereby obtaining a black brown solid. The resulting black brown solid was heated from room temperature to 100° C. under a nitrogen flow (100 ml/min.) over about 0.5 hours and dried at the same temperature for 2 hours, and then heated from 100 to 250° C. under a nitrogen flow (100 ml/min.) over 50 minutes and dried at the same temperature for 3 hours to obtain a black solid (10.5 g). A zirconium oxide-supported ruthenium chloride catalyst was obtained by adjusting a particle size of the resulting black solid to 12 to 18.5 mesh.

The calculated value of the content of ruthenium chloride was as follows.

RuCl$_3$/(RuCl$_3$+ZrO$_2$)×100=9.3% by weight.

The calculated value of the content of ruthenium was as follows.

Ru/(RuCl$_3$+ZrO$_2$)×100=4.5% by weight.

The zirconium oxide-supported ruthenium chloride catalyst (2.5 g) thus obtained was charged in a quartz reaction tube in the same manner as that described in Example 1. According to the same reaction method as that described in Example 1, the reaction was conducted. 1.6 Hours after the beginning of the reaction, the formation activity of chlorine per unit weight of the catalyst was 1.11×10$^{-4}$ mol/min·g-catalyst.

The formation activity of chlorine per unit weight of Ru catalyst was 24.5×10$^{-4}$ mol/min·g-Ru.

EXAMPLE 3

A catalyst was prepared by the following method. That is, a commercially available ruthenium chloride hydrate (RuCl$_3$·nH$_2$O) (0.69 g) was dissolved in water (3.6 g), followed by stirring to obtain an aqueous ruthenium chloride solution. The resulting aqueous solution was added dropwise to a titanium oxide carrier (CS-300S, manufactured by Sakai Chemical Industry Co., Ltd.) (9.5 g), obtained by adjusting a particle size to 12 to 18.5 mesh and drying in air at 500° C. for 1 hour, to impregnate and support ruthenium chloride. The supported one was heated from room temperature to 100° C. under a nitrogen flow (100 ml/min.) over 1 hour and dried at the same temperature for 2 hours, and then heated from 100 to 250° C. under a nitrogen flow (100 ml/min.) over 50 minutes and dried at the same temperature for 3 hours to obtain a black solid (9.6 g). A titanium oxide-supported ruthenium chloride catalyst was obtained by adjusting a particle size of the resulting black solid to 12 to 18.5 mesh.

The calculated value of the content of ruthenium chloride was as follows.

$RuCl_3/(RuCl_3+TiO_2) \times 100 = 5.0\%$ by weight.

The calculated value of the content of ruthenium was as follows.

$Ru/(RuCl_3+TiO_2) \times 100 = 2.4\%$ by weight.

The titanium oxide-supported ruthenium chloride catalyst (2.5 g) thus obtained was charged in a quartz reaction tube in the same manner as that described in Example 1. According to the same reaction method as that described in Example 1 except for passing the hydrogen chloride gas (187 ml/min.) and the oxygen gas (200 ml/min.), the reaction was conducted. 2.4 Hours after the beginning of the reaction, the formation activity of chlorine per unit weight of the catalyst was $2.79 \times 10^{-4}$ mol/min·g-catalyst.

The formation activity of chlorine per unit weight of Ru catalyst was $114.1 \times 10^{-4}$ mol/min·g-Ru.

EXAMPLE 4

A catalyst was prepared by the following method. That is, a commercially available ruthenium chloride hydrate ($RuCl_3 \cdot nH_2O$) (0.28 g) was dissolved in water (4.1 g), followed by stirring to obtain an aqueous ruthenium chloride solution. The resulting aqueous solution was added dropwise to a titanium oxide carrier (CS-300S, manufactured by Sakai Chemical Industry Co., Ltd.) (9.8 g), obtained by adjusting a particle size to 12 to 18.5 mesh and drying in air at 500° C. for 1 hour, to impregnate and support ruthenium chloride. The supported one was heated from room temperature to 100° C. under a nitrogen flow (100 ml/min.) over 1 hour and dried at the same temperature for 2 hours, and then heated from 100 to 250° C. under a nitrogen flow (100 ml/min.) over 1 hour and dried at the same temperature for 3 hours to obtain a black solid (9.8 g). A titanium oxide-supported ruthenium chloride catalyst was obtained by adjusting a particle size of the resulting black solid to 12 to 18.5 mesh.

The calculated value of the content of ruthenium chloride was as follows.

$RuCl_3/(RuCl_3+TiO_2) \times 100 = 2.0\%$ by weight.

The calculated value of the content of ruthenium was as follows.

$Ru/(RuCl_3+TiO_2) \times 100 = 1.0\%$ by weight.

The titanium oxide-supported ruthenium chloride catalyst (2.5 g) thus obtained was charged in a quartz reaction tube in the same manner as that described in Example 1. According to the same reaction method as that described in Example 1 except for passing the hydrogen chloride gas (187 ml/min.) and the oxygen gas (200 ml/min.), the reaction was conducted. 2.2 Hours after the beginning of the reaction, the formation activity of chlorine per unit weight of the catalyst was $2.29 \times 10^{-4}$ mol/min·g-catalyst.

The formation activity of chlorine per unit weight of Ru catalyst was $232 \times 10^{-4}$ mol/min·g-Ru.

EXAMPLE 5

A catalyst was prepared by the following method. That is, a commercially available ruthenium chloride hydrate ($RuCl_3 \cdot nH_2O$) (2.10 g) was dissolved in water (3.7 g), followed by stirring to obtain an aqueous ruthenium chloride solution. Then, water (7.5 g) was charged in an ice-cooled flask, and commercially available titanium tetrachloride (0.044 g) was added dropwise with sufficiently stirring to prepare an aqueous titanium tetrachloride solution, which was added dropwise to the previously prepared aqueous ruthenium chloride solution, followed by sufficient stirring to obtain an aqueous mixed solution of titanium tetrachloride and ruthenium chloride. The resulting aqueous solution was added dropwise to a titanium oxide powder (SSP-20, manufactured by Sakai Chemical Industry Co., Ltd.) (15.0 g), obtained by drying in air at 500° C. for 1 hour, to impregnate and support ruthenium chloride. The supported one was dried at 60° C. for 1 hour to obtain a green solid. The resulting solid was heated from room temperature to 200° C. under a nitrogen flow (100 ml/min.) over about 1 hour and dried at the same temperature for 2 hours to obtain a black powder (10.5 g). The resulting powder was granulated to obtain a titanium oxide-supported titanium chloride-ruthenium chloride of 12 to 18.5 mesh.

The calculated value of the content of ruthenium chloride was as follows.

$RuCl_3/(RuCl_3+TiCl_4+TiO_2) \times 100 = 9.2\%$ by weight.

The calculated value of the content of ruthenium was as follows.

$Ru/(RuCl_3+TiCl_4+TiO_2) \times 100 = 4.5\%$ by weight.

The titanium oxide-supported titanium chloride-ruthenium chloride catalyst (2.5 g) thus obtained was charged in a quartz reaction tube in the same manner as that described in Example 1. According to the same reaction method as that described in Example 1, the reaction was conducted. 1.7 Hours after the beginning of the reaction, the formation activity of chlorine per unit weight of the catalyst was $3.6 \times 10^{-4}$ mol/min·g-catalyst.

The formation activity of chlorine per unit weight of Ru catalyst was $80.2 \times 10^{-4}$ mol/min·g-Ru.

EXAMPLE 6

A catalyst was prepared by the following method. That is, commercially available dodecacarbonyltriruthenium ($Ru_3(CO)_{12}$) (1.05 g) was dissolved in tetrahydrofuran (THF) (190 ml). Then, a substance (10 g) prepared by grinding commercially available titanium oxide (CS300, manufactured by Sakai Chemical Industry Co., Ltd.) was charged in a glass flask and a THF solution of dodecacarbonyltriruthenium was added in such an amount that titanium oxide becomes wet, followed by drying in a rotary evaporator at 60° C. This operation was repeated and the total amount of dodecacarbonyltriruthenium was supported on titanium oxide to obtain a supported catalyst powder (11.0 g). The resulting powder was granulated to obtain a titanium oxide-supported dodecacarbonyltriruthenium catalyst of 12 to 18.5 mesh.

The calculated value of the content of ruthenium carbonyl was as follows.

$Ru_3(CO)_{12}/(Ru_3(CO)_{12}+TiO_2) \times 100 = 9.5\%$ by weight.

The calculated value of the content of ruthenium was as follows.

$Ru/(Ru_3(CO)_{12}+TiO_2) \times 100 = 5.0\%$ by weight.

The titanium oxide-supported dodecacarbonyltriruthenium catalyst (2.5 g) thus obtained was charged in a quartz reaction tube in the same manner as that described in Example 1. According to the same reaction method as that described in Example 1 except for passing the hydrogen chloride gas (202 ml/min.) and the oxygen gas (213 ml/min.), the reaction was conducted. 2.3 Hours after the beginning of the reaction, the formation activity of chlorine per unit weight of the catalyst was $1.14 \times 10^{-4}$ mol/min·g-catalyst.

The formation activity of chlorine per unit weight of Ru catalyst was $22.9 \times 10^{-4}$ mol/min·g-Ru.

EXAMPLE 7

A catalyst was prepared by the following method. That is, commercially available dodecacarbonyltriruthenium ($Ru_3$ $(CO)_{12})$ (0.32 g) was dissolved in tetrahydrofuran (THF) (119 ml). Then, a substance (6 g) prepared by grinding commercially available titanium oxide (CS300, manufactured by Sakai Chemical Industry Co., Ltd.) was charged in a glass flask and a THF solution of dodecacarbonyltriruthenium was added in such an amount that titanium oxide becomes wet, followed by drying in a rotary evaporator at 60° C. Since the THF solution of dodecacarbonyltriruthenium sometimes changes a color when it is allowed to stand in air, it was used for preparing a catalyst with shielding light. This operation was repeated and the total amount of dodecacarbonyltriruthenium was supported on titanium oxide to obtain a supported catalyst powder (5.89 g). The resulting powder was granulated to obtain a titanium oxide-supported ruthenium carbonyl catalyst of 12 to 18.5 mesh.

The calculated value of content of dodecacarbonyltriruthenium was as follows.

$Ru_3(CO)_{12}/(Ru_3(CO)_{12}+TiO_2) \times 100 = 5.0\%$ by weight.

The calculated value of the content of ruthenium was as follows.

$Ru/(Ru_3(CO)_{12}+TiO_2) \times 100 = 2.5\%$ by weight.

The titanium oxide-supported dodecacarbonyltriruthenium catalyst (2.5 g) thus obtained was charged in a quartz reaction tube in the same manner as that described in Example 1. According to the reaction method as that described in Example 1 except for passing the hydrogen chloride gas (187 ml/min.) and the oxygen gas (200 ml/min.) and adjusting the inner temperature to 301° C., the reaction was conducted. 2.0 Hours after the beginning of the reaction, the formation activity of chlorine per unit weight of the catalyst was $2.41 \times 10^{-4}$ mol/min·g-catalyst.

The formation activity of chlorine per unit weight of Ru catalyst was $96.2 \times 10^{-4}$ mol/min·g-Ru.

EXAMPLE 8

A catalyst was prepared by the following method. That is, commercially available dodecacarbonyltriruthenium $(Ru_3(CO)_{12})$ (0.2 g) was dissolved in tetrahydrofuran (THF) (74 ml). Then, a substance (9.8 g) prepared by grinding commercially available titanium oxide (CS300, manufactured by Sakai Chemical Industry Co., Ltd.) was charged in a glass flask and a THF solution of dodecacarbonyltriruthenium was added in such an amount that titanium oxide becomes wet, followed by drying in a rotary evaporator at 60° C. Since the THF solution of dodecacarbonyltriruthenium sometimes changes a color when it is allowed to stand in air, it was used for preparing a catalyst with shielding light. This operation was repeated and the total amount of dodecacarbonyltriruthenium was supported on titanium oxide to obtain a supported catalyst powder (9.2 g). The resulting powder was granulated to obtain a titanium oxide-supported ruthenium carbonyl catalyst of 12 to 18.5 mesh.

The calculated value of the content of ruthenium carbonyl was as follows.

$Ru_3(CO)_{12}/(Ru_3(CO)_{12}+TiO_2) \times 100 = 2.0\%$ by weight.

The calculated value of the content of ruthenium was as follows.

$Ru/(Ru_3(CO)_{12}+TiO_2) \times 100 = 1.0\%$ by weight.

The titanium oxide-supported dodecacarbonyltriruthenium catalyst (2.5 g) thus obtained was charged in a quartz reaction tube in the same manner as that described in Example 1. According to the same reaction method as that described in Example 1 except for passing the hydrogen chloride gas (187 ml/min.) and the oxygen gas (200 ml/min.), the reaction was conducted. 2.0 Hours after the beginning of the reaction, the formation activity of chlorine per unit weight of the catalyst was $1.61 \times 10^{-4}$ mol/min·g-catalyst.

The formation activity of chlorine per unit weight of Ru catalyst was $161 \times 10^{-4}$ mol/min·g-Ru.

EXAMPLE 9

A catalyst was prepared by the following method. That is, a titanium oxide carrier (CS-300S, manufactured by Sakai Chemical Industry Co., Ltd.) (10.0 g), obtained by adjusting a particle size to 12 to 18.5 mesh and drying in air at 500° C. for 1 hour, was charged in a glass beaker and a commercially available trinitranitrosyl ruthenium solution $(Ru(NO)(NO_3)_3$, containing 5 wt % Ru) was added in such an amount that titanium oxide becomes wet, followed by drying on an oil bath at 60° C. under an air flow. This operation was repeated to impregnate and support the trinitranitrosyl ruthenium solution $(Ru(NO)(NO_3)_3$, containing 5 wt % Ru) (10.0 g). The supported one was treated from room temperature to 100° C. under a nitrogen flow (100 ml/min.) over about 1.5 hours and dried at the same temperature for 2 hours, and then treated from room temperature to 250° C. under a nitrogen flow (100 ml/min.) over about 1.5 hours and dried at the same temperature for 3 hours to obtain a black solid (10.6 g). A titanium oxide-supported trinitra-nitrosyl ruthenium catalyst was obtained by adjusting a particle size of the resulting black solid to 12 to 18.5 mesh.

The calculated value of the consent of trinitranitrosyl ruthenium carbonyl was as follows.

$Ru(NO)(NO_3)_3/(Ru(NO)(NO_3)_3+TiO_2) \times 100 = 13.6\%$ by weight.

The calculated value of the content of ruthenium was as follows.

$Ru/(Ru(NO)(NO_3)_3+TiO_2) \times 100 = 4.32\%$ by weight.

The titanium oxide-supported trinitranitrosyl ruthenium catalyst (2.5 g) thus obtained was charged in a quartz reaction tube in the same manner as that described in Example 1. According to the same reaction method as that described in Example 1 except for passing the hydrogen chloride gas (180 ml/min.) and the oxygen gas (180 ml/min.), the reaction was conducted. 1.8 Hours after the beginning of the reaction, the formation activity of chlorine per unit weight of the catalyst was $1.02 \times 10^{-4}$ mol/min·g-catalyst.

The formation activity of chlorine per unit weight of Ru catalyst was $23.6 \times 10^{-4}4$ mol/min·g-Ru.

EXAMPLE 10

A catalyst was prepared by the following method. That is, a commercially available $\mu_3$-oxo-hexa-$\mu$-acetatrichloro triruthenium (1+) acetate hydrate $(Ru_3O(OCOCH_3)_3(H_2O)_3]OCOCH_3 \cdot nH_2O$ (1.3 g) was dissolved in high purity water (3.6 g). The resulting aqueous solution was added dropwise to a titanium oxide carrier (CS-300S, manufactured by Sakai Chemical Industry Co., Ltd.) (10 g), obtained by adjusting a particle size to 12 to 18.5 mesh and drying in air at 500° C. for 1 hour, to impregnate and support the $\mu_3$-oxo-hexa-$\mu$-acetatrichloro triruthenium (1+) acetate. The supported one was drying on an oil bath at 60° C. for 1 hour, and then heated from room temperature to 60° C. under a nitrogen flow (100 ml/min.) over 1 hour and dried at the same temperature for 4 hours to obtain a black solid (10.9 g). A $\mu_3$-oxo-hexa-$\mu$-acetatrichloro triruthenium (1+) acetate catalyst was obtained by adjusting a particle size of the resulting solid to 12 to 18.5 mesh.

The calculated value of the content of $\mu_3$-oxo-hexa-$\mu$-acetatrichloro triruthenium (1+) acetate was as follows.

[Ru$_3$O(OCOCH$_3$)$_3$(H$_2$O)$_3$]OCOCH$_3$/[Ru$_3$(OCOCH$_3$)$_3$(H$_2$O)$_3$]OCOCH3+TiO$_2$)×100=9.3% by weight.

The calculated value of the content of ruthenium was as follows.

Ru/[Ru$_3$O(OCOCH$_3$)$_3$(H$_2$O)$_3$]OCOCH$_3$/[Ru$_3$(OCOCH$_3$)$_3$(H$_2$O)$_3$]OCOCH$_3$+TiO$_2$)×100=4.6% by weight.

The titanium oxide-supported $\mu_3$-oxo-hexa-$\mu$-acetatrichloro triruthenium (1+) acetate (2.5 g) thus obtained was charged in a quartz reaction tube in the same manner as that described in Example 1, except that it is not diluted with titanium oxide. According to the same reaction method as that described in Example 1 except for passing the hydrogen chloride gas (180 ml/min.) and the oxygen gas (180 ml/min.), the reaction was conducted. 1.8 Hours after the beginning of the reaction, the formation activity of chlorine per unit weight of the catalyst was 3.30×10$^{-4}$ mol/min·g-catalyst.

The formation activity of chlorine per unit weight of Ru catalyst was 71.6×10$^{-4}$ mol/min·g-Ru.

EXAMPLE 11

A catalyst was prepared by the following method. First, ion exchange of a carrier silica was conducted. Commercially available aerosil silica (Aerosil-300, manufactured by Nippon Aerosil Co.) (20 g) was charged in a glass flask and water was then charged, followed by heating at reflux for 1 hour. After cooling to room temperature, aqueous ammonia (25% by weight, 5.4 g) was charged in the flask and the mixed solution was allowed to stand for 4 days. Then, the aerosil silica was filtered, sufficiently washed with water and sufficiently dried at room temperature to obtain a NH$^{4+}$ type silica carrier (15.1 g).

This silica carrier (6 g) and water (6.15 g) were charged in a glass flask and a solution prepared by dissolving [Ru(NH$_3$)$_6$]Cl$_3$ (0.92 g) in water (297 ml) was slowly added dropwise under stirring with heating in an oil bath at 60° C., followed by stirring at the same temperature for 2 hours. After the completion of stirring, the reaction solution was volatilized to dryness with heating at 60° C. in a rotary evaporator to obtain a pale yellow powder (5.68 g). This powder was calcined in an air flow at 456° C. for 3 hours to obtain a black powder. The resulting powder was granulated to obtain a silica-supported ruthenium oxide catalyst of 12 to 18.5 mesh.

The calculated value of the content of ruthenium oxide was as follows.

RuO$_2$/(RuO$_2$+SiO$_2$)×100=6.2% by weight.

The calculated value of the content of ruthenium was as follows.

Ru/(RuO$_2$+SiO$_2$)×100=4.7% by weight.

The silica-supported ruthenium oxide catalyst (1.21 g) thus obtained was charged in a quartz reaction tube in the same manner as that described in Example 1 except for mixing with a titanium oxide carrier (5 g) whose particle size was adjusted to 12 to 18.5 mesh to dilute the catalyst. According to the same reaction method as that described in Example 1 except for passing the hydrogen chloride gas (200 ml/min.) and the oxygen gas (200 ml/min.), the reaction was conducted. 1.8 Hours after the beginning of the reaction, the formation activity of chlorine per unit weight of the catalyst was 2.23×10$^{-4}$ mol/min·g-catalyst.

The formation activity of chlorine per unit weight of Ru catalyst was 47.5×10$^{-4}$ mol/min·g-Ru.

Furthermore, volatilization of the ruthenium compound as the catalyst component was not recognized at the reaction outlet.

EXAMPLE 12

A catalyst was prepared by the following method. That is, commercially available titanium oxide powder (SSP-20, manufactured by Sakai Chemical Industry Co., Ltd.) (10 g) was charged in a glass flask and a solution prepared by dissolving [Ru(NH$_3$)$_6$]Cl$_2$ (1.36 g) in water (35.6 g) was then added, followed by the addition of aqueous ammonia (25% by weight, 10 ml) and further stirring in a nitrogen atmosphere. After the completion of stirring, the mixed solution was allowed to stand at room temperature for 2 days. Then, the solution was volatilized to dryness with heating to 60° C. in a rotary evaporator to obtain a pale yellow powder (10.7 g). This powder was heated to 355° C. in an air flow over 4.5 hours, calcined at the same temperature for 3 hours and calcined at 390° C. for 2 hours to obtain a black powder (9.56 g). The resulting powder was granulated to obtain a titanium oxide-supported ruthenium oxide catalyst of 12 to 18.5 mesh.

The calculated value of the content of ruthenium oxide was as follows.

RuO$_2$/(RuO$_2$+TiO$_2$)×100=6.2% by weight.

The calculated value of the content of ruthenium was as follows.

Ru/(RuO$_2$+TiO$_2$)×100=4.7% by weight.

The titanium oxide-supported ruthenium oxide catalyst (2.5 g) thus obtained was charged in a quartz reaction tube in the same manner as that described in Example 1 except for mixing with a titanium oxide carrier (5 g) whose particle size was adjusted to 12 to 18.5 mesh to dilute the catalyst. According to the same reaction method as that described in Example 1 except for passing the hydrogen chloride gas (200 ml/min.) and the oxygen gas (200 ml/min.) and adjusting the inner temperature during the reaction to 299° C., the reaction was conducted. 1.5 Hours after the beginning of the reaction, the formation activity of chlorine per unit weight of the catalyst was 1.62×10$^{-4}$ mol/min·g-catalyst.

The formation activity of chlorine per unit weight of Ru catalyst was 34.5×10$^{-4}$ mol/min·g-Ru.

Furthermore, volatilization of the ruthenium compound as the catalyst component was not recognized at the reaction outlet.

EXAMPLE 13

A catalyst was prepared by the following method. First, ion exchange of a carrier silica was conducted. Commercially available aerosil silica (Aerosil-300, manufactured by Nippon Aerosil Co.) (30 g) was charged in a glass flask and water (450 ml) was then charged, followed by heating at reflux for 1 hour. After cooling to room temperature, aqueous ammonia (25% by weight, 8.1 g) was charged in the flask and the mixed solution was allowed to stand for 2 days. Then, the aerosil silica was filtered, sufficiently washed with water and sufficiently dried in air at 60° C. to obtain a NH$^{4+}$ type silica carrier (27.0 g).

This silica carrier (6 g) and water (20.1 g) were charged in a glass flask and a solution prepared by dissolving [Ru(NH$_3$)$_6$]Cl$_3$ (0.095 g) in water (30 ml) was slowly added dropwise under stirring with heating in an oil bath at 60° C., followed by stirring at the same temperature for 2 hours. After the completion of stirring, the reaction solution was volatilized to dryness with heating at 60° C. in a rotary evaporator to obtain a pale yellow powder. This powder was calcined in an air flow at 456° C. for 3 hours to obtain a gray powder (5.47 g). The resulting powder was granulated to obtain a silica-supported ruthenium oxide catalyst of 12 to 18.5 mesh.

The calculated value of the content of ruthenium oxide was as follows.

$RuO_2/(RuO_2+SiO_2)\times100=0.65\%$ by weight.

The calculated value of the content of ruthenium was as follows.

$Ru/(RuO_2+SiO_2)\times100=0.5\%$ by weight.

The silica-supported ruthenium oxide catalyst (2.5 g) thus obtained was charged in a quartz reaction tube in the same manner as that described in Example 1. According to the same reaction method as that described in Example 1 except for passing the hydrogen chloride gas (187 ml/min.) and the oxygen gas (184 ml/min.), the reaction was conducted. 2.0 Hours after the beginning of the reaction, the formation activity of chlorine per unit weight of the catalyst was $0.54\times10^{-4}$ mol/min·g-catalyst.

The formation activity of chlorine per unit weight of Ru catalyst was $108\times10^{-4}$ mol/min·g-Ru.

Furthermore, volatilization of the ruthenium compound as the catalyst component was not recognized at the reaction outlet.

EXAMPLE 14

A catalyst was prepared by the following method. First, ion exchange of a carrier silica was conducted. Commercially available aerosil silica (Aerosil-300, manufactured by Nippon Aerosil Co.) (10 g) was charged in a glass flask and water (450 ml) was then charged, followed by heating at reflux for 1 hour. After cooling to room temperature, aqueous ammonia (25% by weight, 8.1 g) was charged in the flask and the mixed solution was allowed to stand for 2 days. Then, the aerogel silica was filtered, sufficiently washed with water and sufficiently dried in air at 60° C. to obtain a $NH^{4+}$ type silica carrier (27.0 g).

This silica carrier (6 g) and water (20.1 g) were charged in a glass flask and a solution prepared by dissolving $[Ru(NH_3)_6]Cl_3$ (0.19 g) in water (59 ml) was slowly added dropwise under stirring with heating in an oil bath at 60° C., followed by stirring at the same temperature for 2 hours. After the completion of stirring, the reaction solution was volatilized to dryness with heating at 60° C. in a rotary evaporator to obtain a pale yellow powder. This powder was calcined in an air flow at 456° C. for 3 hours to obtain a blue gray powder (5.53 g). The resulting power was granulated to obtain a silica-supported ruthenium oxide catalyst of 12 to 18.5 mesh.

The calculated value of the content of ruthenium oxide was as follows.

$RuO_2/(RuO_2+SiO_2)\times100=1.3\%$ by weight.

The calculated value of the content of ruthenium was as follows.

$Ru/(RuO_2+SiO_2)\times100=0.99\%$ by weight.

The silica-supported ruthenium oxide catalyst (2.5 g) thus obtained was charged in a quartz reaction tube in the same manner as that described in Example 1. According to the same reaction method as that described in Example 1 except for passing the hydrogen chloride gas (187 ml/min.) and the oxygen gas (202 ml/min.), the reaction was conducted. 2.0 Hours after the beginning of the reaction, the formation activity of chlorine per unit weight of the catalyst was $0.81\times10^{-4}$ mol/min·g-catalyst.

The formation activity of chlorine per unit weight of Ru catalyst was $82.0\times10^{-4}$ mol/min·g-Ru.

Furthermore, volatilization of the ruthenium compound as the catalyst component was not recognized at the reaction outlet.

EXAMPLE 15

A catalyst was prepared by the following method. First, ion exchange of a carrier silica was conducted. Commercially available aerosil silica (Aerosil-300, manufactured by Nippon Aerosil Co.) (10 g) was charged in a glass flask and water (200 ml) was then charged, followed by heating at reflux for 1 hour. After cooling to room temperature, aqueous ammonia (25% by weight, 10.8 g) and water (400 ml) were charged in the flask and the mixed solution was allowed to stand for 2 days. Then, the aerosil silica was filtered, sufficiently washed with water and sufficiently dried in air at 60° C. to obtain a $NH^{4+}$ type silica carrier (8.4 g).

This silica carrier (6 g) and water (20 g) were charged in a glass flask and a solution prepared by dissolving $[Ru(NH_3)_6]Cl_3$ (1.8 g) in water (564 ml) was slowly added dropwise under stirring with heating in an oil bath at 60° C., followed by stirring at the same temperature for 2 hours. After the completion of stirring, the reaction solution was volatilized to dryness with heating at 60° C. in a rotary evaporator to obtain a pale yellow powder. This powder was calcined in an air flow at 456° C. for 3 hours to obtain a black powder (6.3 g). The resulting powder was granulated to obtain a silica-supported ruthenium oxide catalyst of 12 to 18.5 mesh.

The calculated value of the content of ruthenium oxide was as follows.

$RuO_2/(RuO_2+SiO_2)\times100=11.2\%$ by weight.

The calculated value of the content of ruthenium was as follows.

$Ru/(RuO_2+SiO_2)\times100=8.5\%$ by weight.

The silica-supported ruthenium oxide catalyst (2.5 g) thus obtained was charged in a reaction tube in the same manner as that described in Example 1 except for mixing with a titanium oxide carrier (5 g) whose particle size was adjusted to 12 to 18.5 mesh to dilute the catalyst. According to the same reaction method as that described in Example 1 except for passing the hydrogen chloride gas (180 ml/min.) and the oxygen gas (180 ml/min.), the reaction was conducted. 1.8 Hours after the beginning of the reaction, the formation activity of chlorine per unit weight of the catalyst was $2.41\times10^{-4}$ mol/min·g-catalyst.

The formation activity of chlorine per unit weight of Ru catalyst was $28.5\times10^{-4}$ mol/min·g-Ru.

Furthermore, volatilization of the ruthenium compound as the catalyst component was not recognized at the reaction outlet.

EXAMPLE 16

A catalyst was prepared by the following method. That is, a titanium oxide carrier (CS-300S, manufactured by Sakai Chemical Industry Co., Ltd.) (10.0 g), obtained by adjusting a particle size to 12 to 18.5 mesh and drying in air at 500° C. for 1 hour, was charged in a glass beaker and a commercially available trinitranitrosyl ruthenium solution $(Ru(NO)(NO_3)_3$, containing 5 wt % Ru) was added in such an amount that titanium oxide becomes wet, followed by drying on an oil bath at 60° C. under an air flow. This operation was repeated to impregnate and support the trinitranitrosyl ruthenium solution $(Ru(NO)(NO_3)_3$, containing 5 wt % Ru) (10.0 g). The supported one was heated in air at 60° C. for 2 hours, and then oxidized by heating from room temperature to 350° C. under a nitrogen flow (100 ml/min.) over about 2 hours and maintaining at the same temperature for 3 hours to obtain a blue black solid (9.3 g). A titanium oxide-supported ruthenium oxide catalyst was obtained by adjusting a particle size of the resulting black solid to 12 to 18.5 mesh.

The calculated value of the content of trinitranitrosyl ruthenium oxide was as follows.

$RuO_2/(RuO_2+TiO_2) \times 100 = 6.2\%$ by weight.

The calculated value of the content of ruthenium was as follows.

$Ru/(RuO_2+TiO_2) \times 100 = 4.7\%$ by weight.

The titanium oxide-supported ruthenium oxide catalyst (2.5 g) thus obtained was charged in a quartz reaction tube in the same manner as that described in Example 1 except for mixing with a titanium oxide carrier (5 g) whose particle size was adjusted to 12 to 18.5 mesh to dilute the catalyst. According to the same reaction method as that described in Example 1 except for passing the hydrogen chloride gas (180 ml/min.) and the oxygen gas (180 ml/min.), the reaction was conducted. 1.8 Hours after the beginning of the reaction, the formation activity of chlorine per unit weight of the catalyst was $2.39 \times 10^{-4}$ mol/min·g-catalyst.

The formation activity of chlorine per unit weight of Ru catalyst was $51.0 \times 10^{-4}$ mol/min·g-Ru.

Furthermore, volatilization of the ruthenium compound as the catalyst component was not recognized at the reaction outlet.

EXAMPLE 17

A catalyst was prepared by the following method. That is, a commercially available trinitranitrosyl ruthenium solution ($Ru(NO)(NO_3)_3$, containing 5 wt % Ru) (2 g) was dissolved in water (2 g) to obtain a trinitranitrosyl ruthenium solution (4 g). Then, a titanium oxide carrier (CS-300S, manufactured by Sakai Chemical Industry Co., Ltd.) (10 g), obtained by adjusting a particle size to 12 to 18.5 mesh and drying in air at 500° C. for 1 hour, was charged in a glass beaker and was impregnated with the total amount of a trinitranitrosyl ruthenium solution (4 g), followed by drying on an oil bath at 60° C. under an air flow to impregnate and support the total amount of trinitranitrosyl ruthenium. The supported one was heated in air at 60° C. for 2 hours, and then oxidized by heating from room temperature to 350° C. under a nitrogen flow (100 ml/min.) over about 1.5 hours and maintaining at the same temperature for 3 hours to obtain a blue gray solid (10.0 g). A titanium oxide-supported ruthenium oxide catalyst was obtained by adjusting a particle size of the resulting blue gray solid to 12 to 18.5 mesh.

The calculated value of the content of ruthenium oxide was as follows.

$RuO_2/(RuO_2+TiO_2) \times 100 = 1.3\%$ by weight.

The calculated value of the content of ruthenium was as follows.

$Ru/(RuO_2+TiO_2) \times 100 = 1.0\%$ by weight.

The titanium oxide-supported ruthenium oxide catalyst (2.5 g) thus obtained was charged in a quartz reaction tube in the same manner as that described in Example 1. According to the same reaction method as that described in Example 1 except for passing the hydrogen chloride gas (180 ml/min.) and the oxygen gas (180 ml/min.), the reaction was conducted. 1.8 Hours after the beginning of the reaction, the formation activity of chlorine per unit weight of the catalyst was $0.67 \times 10^{-4}$ mol/min·g-catalyst.

The formation activity of chlorine per unit weight of Ru catalyst was $67.4 \times 10^{-4}$ mol/min·g-Ru.

Furthermore, volatilization of the ruthenium compound as the catalyst component was not recognized at the reaction outlet.

EXAMPLE 18

A catalyst was prepared by the following method. That is, a commercially available ruthenium chloride hydrate ($RuCl_3 \cdot nH_2O$, content of ruthenium: 35.5%) (0.89 g) was dissolved in water (3.2 g). After sufficiently stirring the aqueous solution, a zirconium oxide powder (obtained by grinding a zirconium oxide tablet, manufactured by Nikki Chemical Co., Ltd.) (6.0 g) was added dropwise to impregnate and support ruthenium chloride. The supported one was dried at 60° C. for 4 hours to obtain a black powder (6.9 g). This powder was heated in air from room temperature to 350° C. over 3.5 hours and then calcined at the same temperature for 3 hours to obtain a black powder (6.4 g). The resulting powder was granulated to obtain a zirconium oxide-supported ruthenium oxide catalyst of 12 to 18.5 mesh.

The calculated value of the content of ruthenium oxide was as follows.

$RuO_2/RuO_2+ZrO_2) \times 100 = 6.5\%$ by weight.

The calculated value of the content of ruthenium was as follows.

$Ru/(RuO_2+ZrO_2) \times 100 = 4.9\%$ by weight.

The zirconium oxide-supported ruthenium oxide catalyst (2.75 g) thus obtained was charged in a quartz reaction tube in the same manner as that described in Example 1 except for mixing with a titanium oxide carrier (5 g) whose particle size was adjusted to 12 to 18.5 mesh to dilute to the catalyst. According to the same reaction method as that described in Example 1 except for passing the hydrogen chloride gas (202 ml/min.) and the oxygen gas (213 ml/min.), the reaction was conducted. 1.3 Hours after the beginning of the reaction, the formation activity of chlorine per unit weight of the catalyst was $4.04 \times 10^{-4}$ mol/min·g-catalyst.

The formation activity of chlorine per unit weight of Ru catalyst was $82.4 \times 10^{-4}$ mol/min·g-Ru.

Furthermore, volatilization of the ruthenium compound as the catalyst component was not recognized as a brown compound at the reaction outlet.

EXAMPLE 19

A catalyst was prepared by the following method. That is, a commercially available ruthenium chloride hydrate ($RuCl_3 \cdot nH_2O$) (0.70 g) was dissolved in water (4.0 g), followed by sufficient stirring to obtain an aqueous ruthenium chloride solution. The resulting aqueous solution was added dropwise to a silica gel carrier (CARiACT G-10, manufactured by Fuji Silysia Co., Ltd.) (5.0 g), obtained by adjusting a particle size to 12 to 18.5 mesh and drying in air at 500° C. for 1 hour, to impregnate and support ruthenium chloride. The supported one was heated from room temperature to 100° C. under a nitrogen flow (100 ml/min.) over about 0.5 hours and dried at the same temperature for 2 hours, and then heated from room temperature to 350° C. under an air flow (100 ml/min.) over about 2 hours and dried at the same temperature for 3 hours to obtain a black solid (5.4 g). A silica-supported ruthenium oxide catalyst was obtained by adjusting a particle size of the resulting black solid to 12 to 18.5 mesh.

The calculated value of the content of ruthenium oxide was as follows.

$RuO_2/(RuO_2+SiO_2) \times 100 = 6.2\%$ by weight.

The calculated value of the content of ruthenium was as follows.

Ru/(RuO$_2$+SiO$_2$)×100=4.7% by weight.

The silica-supported ruthenium oxide catalyst (2.5 g) thus obtained was charged in a quartz reaction tube in the same manner as that described in Example 1. According to the same reaction method as that described in Example 1 except for passing the hydrogen chloride gas (202 ml/min.) and the oxygen gas (213 ml/min.), the reaction was conducted. 1.7 Hours after the beginning of the reaction, the formation activity of chlorine per unit weight of the catalyst was 2.04×10$^{-4}$ mol/min·g-catalyst.

The formation activity of chlorine per unit weight of Ru catalyst was 43.5×10$^{-4}$ mol/min·g-Ru.

Furthermore, volatilization of the ruthenium compound as the catalyst component was not recognized as a brown compound at the reaction outlet.

EXAMPLE 20

A catalyst was prepared by the following method. That is, a commercially available ruthenium chloride hydrate (RuCl$_3$·nH$_2$O) (0.70 g) was dissolved in water (4.0 g), followed by sufficient stirring to obtain an aqueous ruthenium chloride solution. The resulting aqueous solution was added dropwise to a silica gel carrier (CARiACT G-10, manufactured by Fuji Silysia Co., Ltd.) (5.0 g), obtained by adjusting a particle size to 12 to 18.5 mesh and drying in air at 500° C. for 1 hour, to impregnate and support ruthenium chloride. The supported one was heated from room temperature to 100° C. under a nitrogen flow (100 ml/min.) over about 0.5 hours and dried at the same temperature for 2 hours, and then heated from room temperature to 300° C. under an air flow (100 ml/min.) over about 1 hour and 30 minutes and dried at the same temperature for 3 hours to obtain a black solid (5.3 g). A silica-supported ruthenium oxide catalyst was obtained by adjusting a particle size of the resulting black solid to 12 to 18.5 mesh. The calculated value of the content of ruthenium oxide was 6.2% by weight. The calculated value of the content of ruthenium was 4.7% by weight.

The silica-supported ruthenium oxide catalyst (2.5 g) thus obtained was charged in a quartz reaction tube in the same manner as that described in Example 1. According to the same reaction method as that described in Example 1 except for passing the hydrogen chloride gas (202 ml/min.) and the oxygen gas (213 ml/min.), the reaction was conducted. 2.4 Hours after the beginning of the reaction, the formation activity of chlorine per unit weight of the catalyst was 1.9×10$^{-4}$ mol/min·g-catalyst.

The formation activity of chlorine per unit weight of Ru catalyst was 41.2×10$^{-4}$ mol/min·g-Ru.

Furthermore, volatilization of the ruthenium compound as the catalyst component was not recognized as a brown compound at the reaction outlet.

EXAMPLE 21

A catalyst was prepared by the following method. That is, a commercially available ruthenium chloride hydrate (RuCl$_3$·nH$_2$O) (0.70 g) was dissolved in water (4.0 g), followed by sufficient stirring to obtain an aqueous ruthenium chloride solution. The resulting aqueous solution was added dropwise to a silica gel carrier (CARiACT G-10, manufactured by Fuji Silysia Co., Ltd.) (5.0 g), obtained by adjusting a particle size to 12 to 18.5 mesh and drying in air at 500° C. for 1 hour, to impregnate and support ruthenium chloride. The supported one was heated at 60° C. for 4 hours to obtain a black brown solid. The resulting black brown solid was heated from room temperature to 450° C. under an air flow (100 ml/min.) over about 2 hours and 30 minutes and dried at the same temperature for 3 hours to obtain a black solid (5.3 g). A silica-supported ruthenium oxide catalyst was obtained by adjusting a particle size of the resulting black solid to 12 to 18.5 mesh. The calculated value of the content of ruthenium oxide was 6.2% by weight. The calculated value of the content of ruthenium was 4.7% by weight.

The silica-supported ruthenium oxide catalyst thus obtained was charged in a quartz reaction tube in the same manner as that described in Example 1. According to the same reaction method as that described in Example 1, the reaction was conducted. 1.8 Hours after the beginning of the reaction, the formation activity of chlorine per unit weight of the catalyst was 2.0×10$^{-4}$ mol/min·g-catalyst.

The formation activity of chlorine per unit weight of Ru catalyst was 41.8×10$^{-4}$ mol/min·g-Ru.

Furthermore, volatilization of the ruthenium compound as the catalyst component was not recognized as a brown compound at the reaction outlet.

EXAMPLE 22

A catalyst was prepared by the following method. That is, a commercially available ruthenium chloride hydrate (RuCl$_3$·nH$_2$O) (0.70 g) was dissolved in water (3.0 g), followed by sufficient stirring to obtain an aqueous ruthenium chloride solution. The resulting aqueous solution was added dropwise to an alumina carrier (NKHD, manufactured by Sumitomo Aluminum Co., Ltd.) (5.0 g), obtained by adjusting a particle size to 12 to 18.5 mesh and drying in air at 500° C. for 1 hour, to impregnate and support ruthenium chloride. The supported one was dried at 60° C. for 4 hours to obtain a black brown solid. The resulting black brown solid was heated from room temperature to 100° C. under a nitrogen flow (100 ml/min.) over about 0.5 hours and dried at the same temperature for 2 hours, and then treated from room temperature to 350° C. under an air flow (100 ml/min.) over about 2 hours and 30 minutes and dried at the same temperature for 3 hours to obtain a black solid (5.2 g). An alumina-supported ruthenium oxide catalyst was obtained by adjusting a particle size of the resulting black solid to 12 to 18.5 mesh.

The calculated value of the content of ruthenium oxide was as follows.

RuO$_2$/(RuO$_2$+Al$_2$O$_3$)×100=6.2% by weight.

The calculated value of the content of ruthenium was 4.7% by weight.

The alumina-supported ruthenium oxide catalyst thus obtained was charged in a quartz reaction tube in the same manner as that described in Example 1. According to the same reaction method as that described in Example 1 except for passing the hydrogen chloride gas (200 ml/min.) and the oxygen gas (200 ml/min.), the reaction was conducted. 1.7 Hours after the beginning of the reaction, the formation activity of chlorine per unit weight of the catalyst was 1.55×10$^{-4}$ mol/min·g-catalyst.

The formation activity of chlorine per unit weight of Ru catalyst was 33.0×10$^{-4}$ mol/min·g-Ru.

Furthermore, volatilization of the ruthenium compound as the catalyst component was not recognized as a brown compound at the reaction outlet.

EXAMPLE 23

A catalyst was prepared by the following method. That is, a commercially available ruthenium chloride hydrate ($RuCl_3 \cdot nH_2O$) (0.7 g) was dissolved in water (1.4 g), followed by stirring to obtain an aqueous ruthenium chloride solution. The resulting aqueous solution was added dropwise to a zirconium oxide carrier (E26H6, manufactured by Nikki Chemical Co., Ltd.) (10.0 g), obtained by adjusting a particle size to 12 to 18.5 mesh and drying in air at 500° C. for 1 hour, until pores of the zirconium oxide carrier are nearly filled with the aqueous solution, followed by crying under vacuum at 40° C. for 1 hour. The total amount of the aqueous solution was added dropwise by adding it again to impregnate and support ruthenium chloride, thereby obtaining a black brown solid. The resulting black brown solid was heated from room temperature to 100° C. under a nitrogen flow (100 ml/min.) over about 0.5 hours and dried at the same temperature for 2 hours, and then heated from 100 to 350° C. under an air flow (100 ml/min.) over 2 hours and dried at the same temperature for 3 hours to obtain a black solid (5.2 g). A zirconium oxide-supported ruthenium oxide catalyst was obtained by adjusting a particle size of the resulting black solid to 12 to 18.5 mesh.

The calculated value of the content of ruthenium oxide was as follows.

$RuO_2/(RuO_2+ZrO_2) \times 100 = 6.2\%$ by weight.

The calculated value of the content of ruthenium was as follows.

$Ru/(RuO_2+ZrO_2) \times 100 = 4.7\%$ by weight.

The zirconium oxide-supported ruthenium oxide catalyst thus obtained was charged in a quartz reaction tube in the same manner as that described in Example 1. According to the same reaction method as that described in Example 1 except for passing the hydrogen chloride gas (202 ml/min.) and the oxygen gas (213 ml/min.), the reaction was conducted. 2.5 Hours after the beginning of the reaction, the formation activity of chlorine per unit weight of the catalyst was $4.0 \times 10^{-4}$ mol/min·g-catalyst. The formation activity of chlorine per unit weight of Ru catalyst was $85 \times 10^{-4}$ mol/min·g-Ru.

Furthermore, volatilization of the ruthenium compound as the catalyst component was not recognized as a brown compound at the reaction outlet.

EXAMPLE 24

A catalyst was prepared by the following method. That is, a commercially available ruthenium chloride hydrate ($RuCl_3 \cdot nH_2O$) (0.70 g) was dissolved in water (1.4 g), followed by stirring to obtain an aqueous ruthenium chloride solution. The resulting aqueous solution was added dropwise to a titanium oxide carrier (CS-300S, manufactured by Sakai Chemical Industry Co., Ltd.) (5.0 g), obtained by adjusting a particle size to 12 to 18.5 mesh and drying in air at 500° C. for 1 hour, to impregnate and support ruthenium chloride. The supported one was heated from room temperature to 100° C. under a nitrogen flow (100 ml/min.) over about 0.5 hours and dried at the same temperature for 2 hours, and then heated from room temperature to 350° C. under an air flow (100 ml/min.) over about 2 hours and dried at the same temperature for 3 hours to obtain a black solid (5.2 g). A titanium oxide-supported ruthenium chloride was obtained by adjusting a particle size of the resulting black solid to 12 to 18.5 mesh.

The calculated value of the content of ruthenium oxide was as follows.

$RuO_2/(RuO_2+TiO_2) \times 100 = 6.2\%$ by weight.

The calculated value of the content of ruthenium was as follows.

$Ru/(RuO_2+TiO_2) \times 100 = 4.7\%$ by weight.

The titanium oxide-supported ruthenium oxide catalyst thus obtained was charged in a quartz reaction tube in the same manner as that described in Example 1. According to the same reaction method as that described in Example 1 except for passing the hydrogen chloride gas (200 ml/min.) and the oxygen gas (200 ml/min.), the reaction was conducted. 1.8 Hours after the beginning of the reaction, the formation activity of chlorine per unit weight of the catalyst was $2.37 \times 10^{-4}$ mol/min·g-catalyst. The formation activity of chlorine per unit weighs of Ru catalyst was $50.4 \times 10^{-4}$ mol/min·g-Ru.

Furthermore, volatilization of the ruthenium compound as the catalyst component was not recognized as a brown compound at the reaction outlet.

EXAMPLE 25

A catalyst was prepared by the following method. That is, a commercially available ruthenium chloride hydrate ($RuCl_3 \cdot nH_2O$) (0.84 g) was dissolved in water (2.2 g), followed by stirring to obtain an aqueous ruthenium chloride solution. The resulting aqueous solution was added dropwise to a titanium oxide carrier (CS-300S, manufactured by Sakai Chemical Industry Co., Ltd.) (6.0 g), obtained by adjusting a particle size to 12 to 18.5 mesh and drying in air at 350° C. for 1 hour, to impregnate and support ruthenium chloride. The supported one was dried in air at 60° C. for 1 hour to obtain a black powder. To this powder, an aqueous solution (about 2.5 g) prepared by dissolving commercially available cesium nitrate (2.1 g) was added dropwise until pores of the powder are nearly saturated, followed by drying in air at 60° C. for 0.5 hours. The total amount of the aqueous solution was added dropwise by repeating this operation five times to impregnate and support cesium nitrate (2.1 g). The supported one was dried in air at 60° C. for 4 hours, and then heated from room temperature to 350° C. in air over 3 hours and calcined at the same temperature for 3 hours to obtain a powder (7.94 g). The resulting powder was washed three times with water (0.5 l) using a glass filter and then dried in air at 60° C. for 4 hours to obtain a green black powder (5.88 g). The resulting powder was granulated to obtain a titanium oxide-supported ruthenium oxide catalyst of 12 to 18.5 mesh. The calculated value of the content of ruthenium chloride was 6.2% by weight and the calculated value of the content of ruthenium was 4.7% by-weight.

The titanium oxide-supported ruthenium oxide catalyst (2.5 g) thus obtained was charged in a reaction tube in the same manner as that described in Example 1 except for mixing with a titanium oxide carrier (5 g) whose particle size was adjusted to 12 to 18.5 mesh to dilute the catalyst. According to the same reaction method as that described in Example 1 except for adjusting the inner temperature to 299° C., the reaction was conducted. 1.3 Hours after the beginning of the reaction, the formation activity of chlorine per unit weight of the catalyst was $4.58 \times 10^{-4}$ mol/min·g-catalyst. The formation activity of chlorine per unit weight of Ru catalyst was $97.4 \times 10^{-4}$ mol/min·g-Ru.

Furthermore, volatilization of the ruthenium compound as the catalyst component was not recognized as a brown compound at the reaction outlet.

Comparative Example 1

A catalyst was prepared by the following method. That is, a commercially available ruthenium chloride hydrate ($RuCl_3 \cdot 3H_2O$) (0.70 g) was dissolved in water (4.0 g), followed by sufficient stirring to obtain an aqueous ruthenium chloride solution. The resulting aqueous solution was added dropwise to a silica gel carrier (CARiACT G-10, manufactured by Fuji Silysia Co., Ltd.) (5.0 g), obtained by adjusting a particle size to 12 to 18.5 mesh and drying in air at 500° C. for 1 hour, to impregnate and support ruthenium chloride. The supported one was dried at 60° C. for 4 hours to obtain a black brown solid. The resulting black brown solid was heated from room temperature to 120° C. under a nitrogen flow (100 ml/min.) over about 0.5 hours and dried at the same temperature for 2 hours, and then treated from room temperature to 250° C. under an air flow (100 ml/min.) over about 1.5 hours and dried at the same temperature for 3 hours to obtain a black solid (5.4 g). A silica-supported ruthenium chloride catalyst was obtained by adjusting a particle size of the resulting black solid to 12 to 18.5 mesh.

The calculated value of the content of ruthenium chloride was as follows.

$RuCl_3/(RuCl_3+SiO_2) \times 100 = 9.3\%$ by weight.

The calculated value of the content of ruthenium was as follows.

$Ru/(RuCl_3+SiO_2) \times 100 = 4.5\%$ by weight.

The silica-supported ruthenium chloride catalyst (2.5 g) thus obtained was charged in a quartz reaction tube in the same manner as that described in Example 1. According to the same reaction method as that described in Example 1 except for passing the hydrogen chloride gas (202 ml/min.) and the oxygen gas (213 ml/min.), the reaction was conducted. 1.7 Hours after the beginning of the reaction, the formation activity of chlorine per unit weight of the catalyst was $0.49 \times 10^{-4}$ mol/min·g-catalyst. The formation activity of chlorine per unit weight of Ru catalyst was $10.8 \times 10^{-4}$ mol/min·g-Ru. Furthermore, evaporation of the ruthenium compound as the catalyst component was recognized as a brown compound at the reaction outlet, and orange coloring of the resulting water was also recognized.

Comparative Example 2

A catalyst was prepared by the following method. That is, a commercially available ruthenium chloride hydrate ($RuCl_3 \cdot 3H_2O$) (0.84 g) was dissolved in water (6.0 g), followed by sufficient stirring to obtain an aqueous ruthenium chloride solution. The resulting aqueous solution was added dropwise to a silica gel carrier (CARiACT G-10, manufactured by Fuji Silysia Co., Ltd.) (6.0 g), obtained by adjusting a particle size to 12 to 18.5 mesh and drying in air at 500° C. for 1 hour, to impregnate and support ruthenium chloride. The supported one was heated from room temperature to 100° C. under a nitrogen flow (100 ml/min.) over about 1 hour and dried at the same temperature for 2 hours, and then heated from 100 to 250° C. over about 1 hour and dried at the same temperature for 3 hours to obtain a black solid (6.48 g). A silica-supported ruthenium chloride catalyst was obtained by adjusting a particle size of the resulting black solid to 12 to 18.5 mesh.

The calculated value of the content of ruthenium chloride was as follows.

$RuCl_3/(RuCl_3+SiO_2) \times 100 = 9.4\%$ by weight.

The calculated value of the content of ruthenium was as follows.

$Ru/(RuCl_3+SiO_2) \times 100 = 4.6\%$ by weight.

The silica-supported ruthenium chloride catalyst (2.5 g) thus obtained was charged in a quartz reaction tube in the same manner as that described in Example 1. According to the same reaction method as that described in Example 1 except for passing the hydrogen chloride gas (187 ml/min.) and the oxygen gas (200 ml/min.), the reaction was conducted. 2.6 Hours after the beginning of the reaction, the formation activity of chlorine per unit weight of the catalyst was $0.17 \times 10^{-4}$ mol/min·g-catalyst. The formation activity of chlorine per unit weight of Ru catalyst was $3.8 \times 10^{-4}$ mol/min·g-Ru. Furthermore, evaporation of the ruthenium compound as the catalyst component was recognized as a brown compound at the reaction outlet.

Comparative Example 3

A catalyst was prepared by the following method. That is, a commercially available ruthenium chloride hydrate ($RuCl_3 \cdot 3H_2O$) (0.70 g) was dissolved in water (3.0 g), followed by sufficient stirring to obtain an aqueous ruthenium chloride solution. The resulting aqueous solution was added dropwise to an alumina carrier (NKHD-24, manufactured by Sumitomo Aluminum Co., Ltd.) (5.0 g), obtained by adjusting a particle size to 12 to 18.5 mesh and drying in air at 500° C. for 1 hour, to impregnate and support ruthenium chloride. The supported one was dried at 60° C. for 4 hours to obtain a black brown solid. The resulting black brown solid was heated from room temperature to 120° C. under a nitrogen flow (100 ml/min.) over about 0.5 hours and dried at the same temperature for 2 hours, and then treated from room temperature to 250° C. under an air flow (100 ml/min.) over about 1.5 hours and dried at the same temperature for 3 hours to obtain a black solid (5.2 g). An alumina-supported ruthenium chloride catalyst was obtained by adjusting a particle size of the resulting black solid to 12 to 18.5 mesh.

The calculated value of the content of ruthenium chloride was as follows.

$RuCl_3/(RuCl_3+Al_2O_3) \times 100 = 9.3\%$ by weight.

The calculated value of the content of ruthenium was as follows.

$Ru/(RuCl_3+Al_2O_3) \times 100 = 4.5\%$ by weight.

The alumina-supported ruthenium chloride catalyst (2.5 g) thus obtained was charged in a quartz reaction tube in the same manner as that described in Example 1. According to the same reaction method as that described in Example 1 except for passing the hydrogen chloride gas (200 ml/min.) and the oxygen gas (200 ml/min.), the reaction was conducted. 1.8 Hours after the beginning of the reaction, the formation activity of chlorine per unit weight of the catalyst was $0.45 \times 10^{-4}$ mol/min·g-catalyst. The formation activity of chlorine per unit weight of Ru catalyst was $10.0 \times 10^{-4}$ mol/min·g-Ru.

Comparative Example 4

A catalyst was prepared by the following method. That is, chromium nitrate enneahydrate (60.3 g) was dissolved in water (600 ml) and the solution was heated to 45° C. Then, 25 wt % ammonia water (64.9 g) was added dropwise over 1.5 hours with stirring, followed by stirring at the same temperature for additional 30 minutes. Water (3.3 liter) was added to the formed precipitate and, after standing overnight to cause sedimentation, the supernatant was removed by decantation. Then, water (2.7 liter) was added, followed by stirring sufficiently for 30 minutes. After the precipitate was washed by repeating this operation five times, the supernatant was removed by decantation. Then, 20 wt % silica sol (49 g) was added and, after stirring, the mixture was volatilized to dryness at 60° C. using a rotary evaporator. The resultant was dried at 60° C. for 8 hours and then dried at 120° C. for 6 hours to obtain a green solid. This solid was dried in a nitrogen flow at 120° C. for 6 hours and then cooled to room temperature to obtain a green solid. Then, this solid was calcined in air at 600° C. for 3 hours and then granulated to obtain a $Cr_2O_3$-$SiO_2$ catalyst of 12 to 18.5 mesh.

The $Cr_2O_3$-$SiO_2$ catalyst (2.5 g) thus obtained was charged in a quartz reaction tube in the same manner as that described in Example 1. According to the same manner as that described in Example 1 except for passing the hydrogen chloride gas (192 ml/min.) and adjusting the inner temperature to 301° C., the reaction was conducted. 3.7 Hours after the beginning of the reaction, the formation activity of chlorine per unit weight of the catalyst was $0.19 \times 10^{-4}$ mol/min·g-catalyst.

Comparative Example 5

A catalyst was prepared by the following method. That is, commercially available tetraethyl orthosilicate (41.9 g) was dissolved in ethanol (186 ml) and titanium tetraisopropoxide (56.8 g) was poured into the solution with stirring at room temperature. After stirring at room temperature for 1 hour, a solution which is obtained by sufficiently mixing an aqueous acetic acid solution (0.01 mol/l), prepared by dissolving acetic acid (0.14 g) in high purity water (233 ml), with ethanol (93 ml) was added dropwise. As the solution added dropwise, a white precipitate was formed. After the completion of the dropwise addition, the solution was stirred at room temperature for 0.5 hours, heated with stirring and then refluxed on an oil bath at 102° C. for 1 hour. The temperature of the solution at this time was 80° C. This solution was air-cooled, filtered with a glass filer, washed with high purity water (500 ml) and then filtered again. After this operation was repeated twice, the resultant was dried in air at 60° C. for 1 hour, heated from room temperature to 550° C. for 1.5 hours and then calcined at the same temperature for 3 hours to obtain a white solid (27.4 g). The resulting solid was pulverized to obtain a titania silica powder.

The resulting titania silica powder (8.0 g) was impregnated with a solution prepared by dissolving a commercially available ruthenium chloride hydrate (content of Ru: 35.5%) in water (8.2 g), followed by drying in air at 60° C. for 1 hour to support ruthenium chloride. The supported one was treated from room temperature to 300° C. under a mixed flow of hydrogen (50 ml/min.) and nitrogen (100 ml/min.) over about 1 hour and 30 minutes, reduced at the same temperature for 1 hour and then air-cooled to room temperature to obtain a black titania silica-supported metal ruthenium (8.4 g).

This titania silica-supported metal ruthenium (8.4 g) was heated from room temperature to 600° C. in an air atmosphere over 3 hours and 20 minutes and then calcined at the same temperature for 3 hours to obtain a black powder (8.5 g). The resulting power was granulated to obtain a titania silica-supported ruthenium oxide catalyst of 12 to 18.5 mesh due to molding.

The calculated value of the content of ruthenium chloride was as follows.

$RuO_2/(RuO_2+TiO_2 \cdot SiO_2) \times 100 = 6.2\%$ by weight.

The calculated value of the content of ruthenium was as follows.

$Ru/(RuO_2+TiO_2+SiO_2) \times 100 = 4.7\%$ by weight.

The titania silica-supported ruthenium chloride catalyst (2.5 g) thus obtained was charged in a reaction tube in the same manner as that described in Example 1. According to the same reaction method as that described in Example 1 except for passing the hydrogen chloride gas (180 ml/min.) and the oxygen gas (180 ml/min.), the reaction was conducted. 2 Hours after the beginning of the reaction, the formation activity of chlorine per unit weight of the catalyst was $0.46 \times 10^{-4}$ mol/min·g-catalyst. The formation activity of chlorine per unit weight of Ru catalyst was $9.77 \times 10^{-4}$ mol/min·g-Ru.

Comparative Example 6

A catalyst was prepared by the following method. First, ion exchange of a carrier silica was conducted. Commercially available aerogsil silica (Aerosil-300, manufactured by Nippon Aerosil Co.) (10 g) was charged in a glass flask and water (200 ml) was then charged, followed by heating at reflux for 1 hour. After cooling to room temperature, aqueous ammonia (25% by weight, 16.2 g) and water (700 ml) were charged in the flask and the mixed solution was allowed to stand for 2 days. Then, the aerosil silica was filtered, sufficiently washed with water and sufficiently dried in air at 60° C. to obtain a $NH^{4+}$ type silica carrier (8.07 g).

This silica carrier (3.7 g) and water (120 ml) were charged in a glass flask and a solution prepared by dissolving [$Ru(NH_3)_6$]$Cl_3$ (5.0 g) in water (1500 ml) was slowly added dropwise under stirring with heating in an oil bath at 60° C., followed by stirring at the same temperature for 2 hours. After the completion of stirring, the reaction solution was volatilized to dryness with heating at 60° C. in a rotary evaporator to obtain a pale yellow powder. This powder was calcined in an air flow at 456° C. for 3 hours to obtain a black powder (5.5 g). The resulting powder was granulated to obtain a silica-supported ruthenium oxide catalyst of 12 to 18.5 mesh.

The calculated value of the content of ruthenium oxide was as follows.

$RuO_2/(RuO_2+SiO_2) \times 100 = 36\%$ by weight.

The calculated value of the content of ruthenium was as follows.

$Ru/(RuO_2+SiO_2) \times 100 = 27\%$ by weight.

The silica-supported ruthenium oxide catalyst (2.5 g) thus obtained was charged in a reaction tube in the same manner as that described in Example 1 except for sufficiently mixing with a titanium oxide carrier (5 g) whose particle size was adjusted to 12 to 18.5 mesh to dilute the catalyst. According to the same reaction method as that described in Example 1 except for passing the hydrogen chloride gas (194 ml/min.) and the oxygen gas (198 ml/min.), the reaction was conducted. 1.8 Hours after the beginning of the reaction, the formation activity of chlorine per unit weight of the catalyst was $3.86 \times 10^{-4}$ mol/min·g-catalyst.

The formation activity of chlorine per unit weight of Ru catalyst was $14.1 \times 10^{-4}$ mol/min·g-Ru.

What is claimed is:

1. A process for producing chlorine by oxidizing hydrogen chloride with oxygen, which comprises using at least one catalyst selected from the group consisting of the following catalysts (a) and (b):

(a) a supported ruthenium chloride catalyst, in which a carrier is a carrier containing at least one compound of titanium oxide and zirconium oxide and a weight ratio of ruthenium to the carrier is from 0.5 to 20% by weight, and (b) a catalyst obtained by supporting at least one ruthenium compound selected from the group consisting of ruthenium-carbonyl complex, ruthenium organic acid salt, and ruthenium-nitrosyl complex on a carrier, in which a weight ratio of ruthenium to the carrier is from 0.5 to 20% by weight, wherein, at the same process conditions, the activity of chlorine formation using said catalyst obtained by supporting at least one ruthenium compound on a carrier is higher than the activity of chlorine formation using ruthenium trichloride.

2. The process according to claim 1, wherein the weight ratio of ruthenium to the carrier of the catalyst (a) is from 1 to 8% by weight.

3. The process according to claim 1, wherein the carrier of the catalyst (a) is titanium oxide.

4. The process according to claim 1, wherein the catalyst (a) is a catalyst which further contains titanium chloride.

5. The process according to claim 1, wherein the weight ratio of ruthenium to the carrier of the catalyst (b) is from 1 to 8% by weight.

6. The process according to claim 1, wherein the catalyst (b) is a catalyst obtained by supporting at least one ruthenium compound selected from the group consisting of ruthenium-carbonyl complex, ruthenium acetic acid salt and ruthenium-nitrosyl complex on a carrier.

7. The process according to claim 1, wherein the reaction temperature of the reaction for oxidizing hydrogen chloride with oxygen is from 200 to 380° C., the reaction pressure is from atmospheric pressure to 50 atm, pure oxygen is used as oxygen, and a molar ratio of hydrogen chloride to oxygen is from 0.1:4 to 10:4.

* * * * *